United States Patent [19]

Krizan

[11] Patent Number: 5,080,698

[45] Date of Patent: Jan. 14, 1992

[54] AROMATIC POLYETHERS CONTAINING CYANO GROUPS FOR GAS SEPARATION

[75] Inventor: Timothy D. Krizan, Wilmington, Del.

[73] Assignees: E. I. du Pont de Nemours and Company, Wilmington, Del.; L'Air Liquide S.A., Paris, France

[21] Appl. No.: 691,654

[22] Filed: Apr. 25, 1991

[51] Int. Cl.$^5$ .............................................. B01D 53/22
[52] U.S. Cl. ........................................ 55/158; 55/16; 521/180; 521/189; 528/211; 528/125; 528/128; 528/171; 528/173; 528/174; 528/206; 528/208; 528/210
[58] Field of Search ................ 55/158, 16; 521/180, 521/189

[56] References Cited

U.S. PATENT DOCUMENTS

| | | | |
|---|---|---|---|
| 3,730,946 | 5/1973 | Heath et al. | 260/47 R |
| 3,899,309 | 8/1975 | Hoehn et al. | 29/16 |
| 4,567,248 | 1/1986 | Blinne et al. | 528/211 |
| 4,640,975 | 2/1987 | Matsuo et al. | 528/211 |
| 4,663,427 | 5/1987 | Matsuo et al. | 528/211 |
| 4,703,104 | 10/1987 | Matsuo et al. | 528/211 |
| 4,812,507 | 3/1989 | Matsuo et al. | 524/611 |
| 4,972,016 | 11/1990 | Murkami | 524/449 |

OTHER PUBLICATIONS

D. K. Mohanty et al., "Synthesis and Characterization of Polyarylene Ether Nitriles"; *Polymer Preprints* 27; pp. 147–149 (1986).

D. K. Mohanty et al.; "Poly(Arylene Ether Sulfones) and Related Materials via a Potassium Carbonate, N--Methyl Pyrrolidone Process", *Polymer Preprints* 23(1); pp. 284–286; (1982).

Primary Examiner—Morton Foelak

[57] ABSTRACT

The disclosed invention is directed to polycyanoarylether membranes. These membranes are formed by reacting an aromatic diol with a dihalobenzonitrile or dinitrobenzonitrile in the presence of a base and a polar, aprotic solvent. These membranes can be provided as either homopolymers or copolymers.

14 Claims, No Drawings

AROMATIC POLYETHERS CONTAINING CYANO GROUPS FOR GAS SEPARATION

FIELD OF THE INVENTION

This invention generally concerns semi-permeable membranes prepared from polymers which are useful in gas separations. In particular, this invention concerns semi-permeable membranes prepared from polyethers.

BACKGROUND OF THE INVENTION

The use of polymeric materials as semi-permeable membranes is well known. Such polymeric materials may include, for example, aromatic polyimides, polyesters and polyamides as shown in U.S. Pat. No. 3,899,309.

Various methods are known for manufacture of polyethers such as polycyanoarylethers. U.S. Pat. No. 3,730,946 shows manufacture of cyanoaryloxy polymers by reacting a dinitrobenzene that has a cyano group attached directly to the benzene nucleus, with an alkali metal salt of a divalent, carbocyclic, aromatic radical in the presence of a dipolar aprotic solvent. U.S. Pat. No. 3,730,946, however, does not suggest that cyanoaryloxy polymers have utility as semi-permeable gas separation membranes.

U.S. Pat. No. 4,640,975 relates to polycyanoarylethers which show excellent heat resistance and fire retardance. These polycyanoarylethers are formed by reacting a dihalobenzonitrile with an alkali metal salt of dihydroxynaphthalene in the presence of a solvent. U.S. Pat. No. 4,640,975, however, does not suggest utility of polycyanoarylethers as semi-permeable separation membranes.

U.S. Pat. No. 4,812,507 relates to polycyanoarylethers and methods for their preparation. This patent, like U.S. Pat. No. 4,640,975, also does not suggest utility of polycyanoarylethers as semi-permeable separation membranes.

Aromatic polyether nitriles have been synthesized in the art. Examples of synthesis procedures are shown in D. K. Mohanty et al, "Synthesis and Characterization of Polyarylene Ether Nitriles", *Polymer Preprints*, 27 (1) pp. 147–149, (1986), and in D. K. Mohanty et al, "Poly-(Arylene Ether Sulfones) and Related Materials Via A Potassium Carbonate, N-Methyl Pyrrolidone Process", *Polymer Preprints*, 23 (1), pp. 284–286, (1982).

As indicated, the semi-permeable membranes of the prior art have been provided as polymers such as imides, esters, amides, and the like. Although these polymers have been found suitable for separating a wide variety of gaseous mixtures, these materials can be costly to manufacture due to the need for expensive reactant materials. Moreover, some of these polymers are susceptible to moisture degradation which leads to reduced performance. A need, therefore, exists for semi-permeable membrane materials which may be inexpensively manufactured and which show superior gas separation properties while overcoming the performance limitations of the membranes of the prior art.

SUMMARY OF THE INVENTION

The disclosed invention is directed to polycyanoarylether membranes. The polymers of these membranes are formed by reacting an aromatic diol with a dihalobenzonitrile or dinitrobenzonitrile in the presence of a base and a polar, aprotic solvent. These membranes can be provided as either homopolymers or copolymers.

Polymers have the general formula $(-Ar_a-O-Ar_a'-O-Ar_b-O-Ar_b'-O-)_n$ where $Ar_a$, $Ar_a'$, $Ar_b$ and $Ar_b'$ are aryl groups and either $Ar_a'$ or $Ar_b'$ is an aromatic ring having at least one cyano group directly attached thereto. Alternatively, $Ar_a'$ and $Ar_b'$ both are aromatic rings having at least one cyano group directly attached thereto.

A homopolymer is defined when $Ar_a$ is the same as $Ar_b$ and $Ar_a'$ is the same as $Ar_b'$. In this case, the general formula could be simplified to read $(O-Ar-O-Ar'-)_n$, where Ar is different from Ar' and Ar' is the directly-linked cyano-substituted aromatic ring.

$Ar_a$ and $Ar_b$ may be selected from

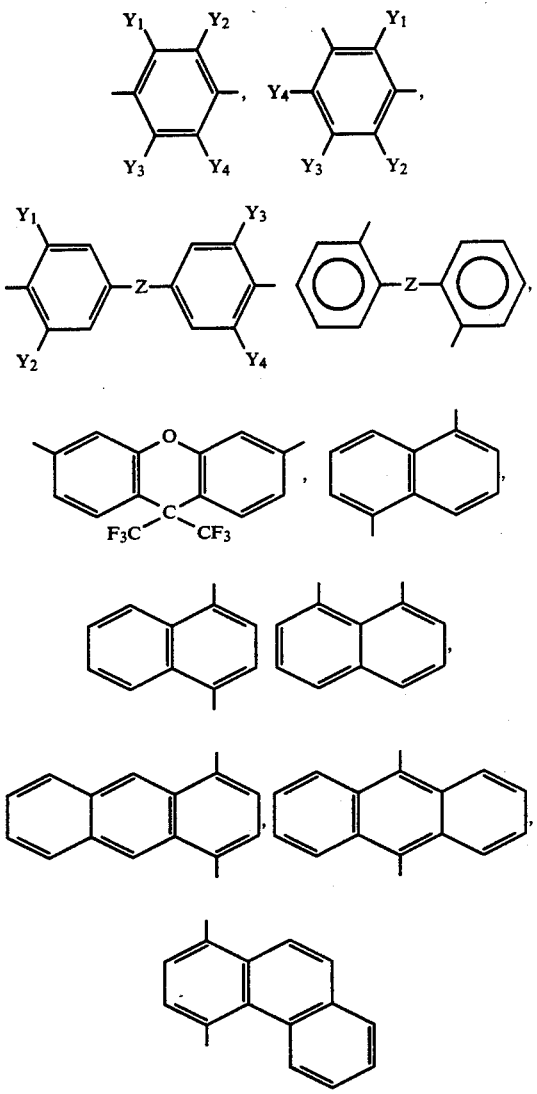

phenolphthalein, or substituted phenolphthaleins where —Z— is any one of carbon-carbon single bond, or

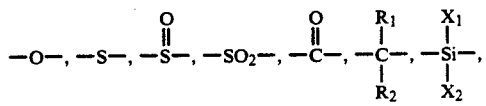

-continued

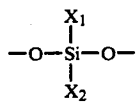

where $R_1$ and $R_2$ independently are H, $C_1$–$C_{10}$ alkyl, $C_1$–$C_{10}$ fluoroalkyl, or $C_6$–$C_{14}$ aryl; where $X_1$ and $X_2$ independently are $C_1$–$C_{10}$ alkyl, $C_1$–$C_{10}$ fluoroalkyl or $C_6$–$C_{14}$ aryl; and where $Y_1$, $Y_2$, $Y_3$, and $Y_4$ independently are halogen, $R_1$, or $R_2$.

$Ar_a'$ and $Ar_b'$ may be selected from

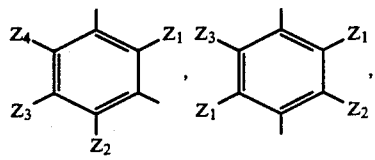

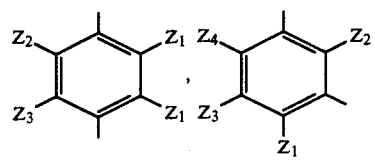

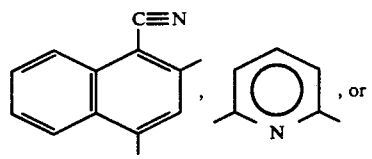

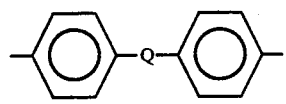

where Q is —SO$_2$— or

where $Z_1$ is —C≡N, —NO$_2$, —SO$_2$R, or

R is $C_1$–$C_{10}$ alkyl or $C_6$–$C_{18}$ aryl; and —$Z_2$, —$Z_3$ and $Z_4$ are —$Z_1$ or —H; wherein at least one of $Ar_a'$ or $Ar_b'$ is selected from

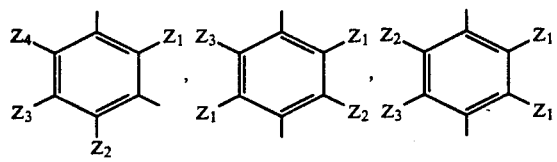

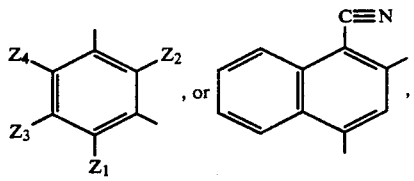

where —$Z_1$ is —C≡N.

In the case of the homopolymer defined by the formula —(O—Ar—O—Ar'—)$_n$—; Ar may be one of the structures defined for $Ar_a$ or $Ar_b$ and Ar' may be selected from

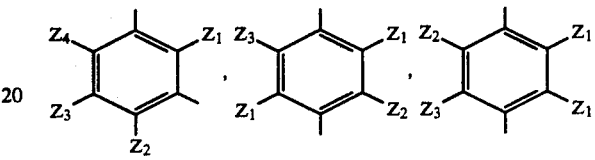

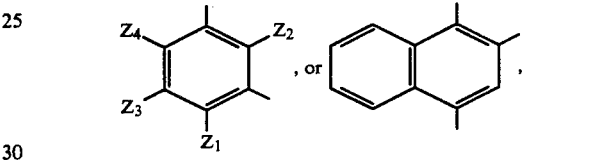

where —$Z_1$ is —C≡N.

The polyether membranes of the invention show surprisingly improved selectivity with respect to gas separations, especially in regards to nitrogen separations from air. The membranes, which may be formed into a variety of shapes such as sheets and hollow fibers, show excellent heat resistance, superior resistance to chemicals, and satisfactory mechanical properties. Accordingly, the polyether membrane produced in accordance with the present invention advantageously can be used to separate a wide variety of fluid mixtures such as, but not limited to, nitrogen-air, hydrogen-carbon monoxide, nitrogen-oxygen, hydrogen-methane, carbon dioxide-methane, liquid mixtures, or to concentrate gases or liquids.

DETAILED DESCRIPTION OF THE INVENTION

Having briefly summarized the invention, the invention will now be described in detail by reference to the following specification and non-limiting examples. Unless otherwise specified, all percentages are by weight and all temperature are in degrees Celsius.

The polyether membranes of the invention generally can be formed by reacting an aromatic diol with a dihalo or di-nitro substituted aromatic compound having a highly electronegative substituent and halo- or nitro-substituents in the ortho or para positions or in both ortho positions to the highly electronegative substituent. As used herein, halo substituents may include halogens such as chlorine and fluorine. Similarly, as used herein, the term highly electronegative substituent is defined as a substituent that is sufficiently electronegative to facilitate displacement of the halogen group or nitro group on the di-halo or di-nitro substituted aromatic compound. Examples of highly electronegative substituents include, but are not limited to, cyano, carbonyl, sulfonyl, nitro and the like. For this invention, at least one of the di-halo or di-nitro substituted aromatic compounds must have at least one cyano group as a highly electronegative substituent.

The reaction of the aromatic diol with the di-halo or di-nitro substituted aromatic compound is performed in the presence of a base and a high boiling point, polar, aprotic solvent.

Any aromatic diol that provides an amorphous polyether polymer may be employed to form the polyethers of the invention. Suitable aromatic diols include diols that have an aromatic nucleus that has at least one phenyl ring. Such aromatic nuclei include, but are not limited to benzene, naphthalene, anthracene, phenanthrene, and the like. These aromatic nuclei may be substituted with alkyl and phenyl groups.

Examples of phenyl substituents include but are not limited to benzene, naphthalene, anthracene, phenyl, naphthyl, alkyl substituted phenyl such as $C_1$–$C_{10}$ alkyl, aryl substituted phenyl such as biphenyl, terphenyl, and the like, and alkylene substituted phenyls such as vinyl substituted phenyl, and the like.

Examples of alkyl substituents include but are not limited to $C_{1-10}$ linear branched alkyl such as methyl, ethyl, propyl, tertiary-butyl, and the like, preferably methyl and tertiary-butyl, most preferably tertiary-butyl.

Examples of aryl substituents include but are not limited to phenyl, naphthyl, alkyl substituted phenyl, aryl substituted phenyl such as biphenyl, terphenyl, and the like, and alkylene substituted phenyls such as vinyl substituted phenyl, preferably phenyl, naphthyl, most preferably phenyl.

Accordingly, examples of aromatic diols suitable for use in the invention include, but are not limited to 2,2-bis(4-hydroxyphenyl)propane (bisphenol A (BPA)), 1,1-bis(4-hydroxyphenyl)-1-phenylethane (bisphenol AP (BPAP)), 2,2-bis(4-hydroxyphenyl)-1,1,1,3,3,3-hexafluoropropane (bisphenol AF (BPAF)), mixtures of BPA and BPAF, thiodiphenols, mixtures of BPA and 2,2'-dihydroxybiphenyl, mixtures of BPA and 1,5-naphthalenediol, phenylhydroquinones, phenolphthalein, tertiary-butylhydroquinones, mixtures of BPA with 3,3'-ditertiary-butyldiphenols, and the like. Most preferably, the aromatic diol is bisphenol A.

A variety of di-halo or di-nitro substituted aromatic compounds may be employed with the above mentioned aromatic diols. Generally, these halo-substituted aromatic compounds can include dihalobenzonitriles, 2,4- and 2,6-dihalobenzophenones, 2,4- and 2,6-dihalophenylsulfones, 2,6-dihalopyridine, and the like as well as mixtures thereof. Examples of di-nitro substituted benzonitriles include but are not limited to, 2,6-dinitrobenzonitrile, 2,4-dinitrobenzonitrile, and the like.

The di-halo substituted aromatic compounds containing at least one cyano group can include dihalobenzonitrile, dihalodicyanobenzenes, dihalonaphthonitrile and the like.

Preferably, dihalobenzonitriles are employed with the diols. Examples of dihalobenzonitriles include, but are not limited to, 2,6-difluorobenzonitrile, 2,4-difluorobenzonitrile, 2,4- and 2,6-dichlorobenzonitrile, and the like; most preferably 2,6-difluorobenzonitrile.

As mentioned, the polyethers of the invention are formed by reacting aromatic diols with a di-halo or di-nitro substituted aromatic compound having a highly electronegative substituent and having halo- or nitro-substituents in the ortho and para position or in both ortho positions to the electronegative substituent. This reaction is performed in the presence of a mixture of a base and a high boiling point, polar aprotic solvent. The relative amounts of base and solvent can be varied over wide limits provided that the amount of solvent is sufficient to retain the polymer in solution. Generally, the base material is present in a 2 to 1 molar ratio to the aromatic diol, preferably in 30–50 mole percent in excess of aromatic diol. Correspondingly, the amount of solvent used in the base-solvent-monomer mixture may be varied over a wide range. Generally, on a weight basis, one can employ from 50 to 98 percent solvent per total weight of the solvent-base-monomer mixture, preferably 55 to 80 percent by weight.

Base materials suitable for use in the invention include, but are not limited to, alkaline earth and alkali metal carbonates such as potassium carbonate, lithium carbonate, sodium carbonate, cesium carbonate, and the like; most preferably potassium carbonate. Generally, a significant excess of base is present in the reaction mixture. The specific amounts of base can be readily determined by those skilled in the art. The preferred moles of potassium carbonate is 1.3–1.5 times the moles of dihaloaromatic(s) in the mixture. Solvents suitable for use in the base-solvent mixture include, but are not limited to N,N-dimethylacetamide (DMAc), N-methylpyrrolidinone (NMP), N,N-dimethylformamide (DMF), dimethylsulfoxide (DMSO), hexamethylphosphoramide, pyridine, and the like, preferably NMP.

The reaction of the aromatic diol with a di-halo or di-nitro substituted aromatic compound having a highly electronegative substituent and halo or nitro substituents in the ortho and para position or in both ortho positions to the electronegative substituent may be performed over a wide range of temperatures, pressures, and atmospheres provided that the solvent is not decomposed or vaporized. Reaction temperatures preferably are 100° to 190° C., most preferably about 180° C. Pressures preferably are about one atmosphere. Suitable atmospheres for the reaction include nitrogen, hydrocarbon atmospheres such as $C_1$–$C_{10}$ alkanes, argon, and air. Most preferably, the reaction is performed under nitrogen atmosphere at ambient pressure.

During reaction of the aromatic diol and the di-halo or di-nitro substituted aromatic compound having a highly electronegative substituent to form the substituted polyethers of the invention, water may form as a reaction by-product. The water by-product may be removed by providing an azeotropic material in the base-solvent mixture. Examples of azeotropic materials for use in the solvent-base mixture include, but are not limited to, toluene, xylene, chlorobenzene, and the like, preferably toluene. The amount of azeotropic material employed in the solvent-base mixture is sufficient to remove substantially all of the water which may be formed during the reaction. Such amounts can readily be determined by those skilled in the art.

After the polyether product is formed, it is subjected to a washing cycle to separate the polyether from the solvent-base mixture. Thereafter, the resultant product is vacuum dried to remove residual solvent and moisture.

The aromatic polycyanoarylethers of the invention have the general formula $(-Ar_a-O-Ar_a'-O-Ar_b-O-Ar_b'-O-)_n$ where $Ar_a$, $Ar_a'$, $Ar_b$ and $Ar_b'$ are aryl groups and either $Ar_b'$ or $Ar_b'$ is an aromatic ring having at least one cyano group directly attached thereto. Alternatively, $Ar_a'$ and $Ar_b'$ may both be aromatic rings having at least one cyano group directly attached thereto.

Ar$_a$ may be the same as or different from Ar$_b$. Similarly, Ar$_a'$ may be the same as or different from Ar$_b'$. Where Ar$_a$ is the same as Ar$_b$ and Ar$_a'$ is the same as Ar$_b'$, a homopolymer is defined having the simplified general formula (—O—Ar—O—Ar'—)$_n$.

Generally, Ar$_a$ and Ar$_b$ (or Ar in the homopolymer) are selected from

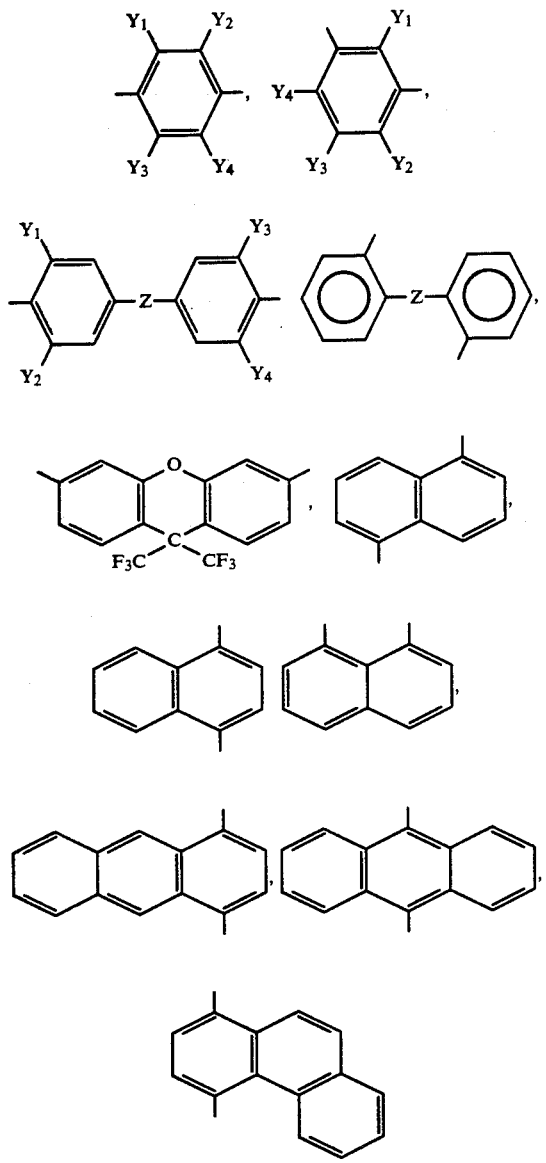

phenolphthalein, or substituted phenolphthalein, where —Z— is any one of carbon-carbon single bond,

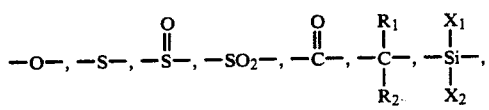

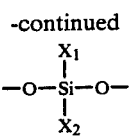

where R$_1$ and R$_2$ independently are H, C$_1$–C$_{10}$ alkyl, C$_1$–C$_{10}$ fluoroalkyl, or C$_6$–C$_{14}$ aryl; where X$_1$ and X$_2$ independently are C$_1$–C$_{10}$ alkyl, C$_1$–C$_{10}$ fluoroalkyl or C$_6$–C$_{14}$ aryl; and where Y$_1$, Y$_2$, Y$_3$, and Y$_4$ independently are halogen, R$_1$, or R$_2$.

Preferably, Ar$_a$ and Ar$_b$ are selected from

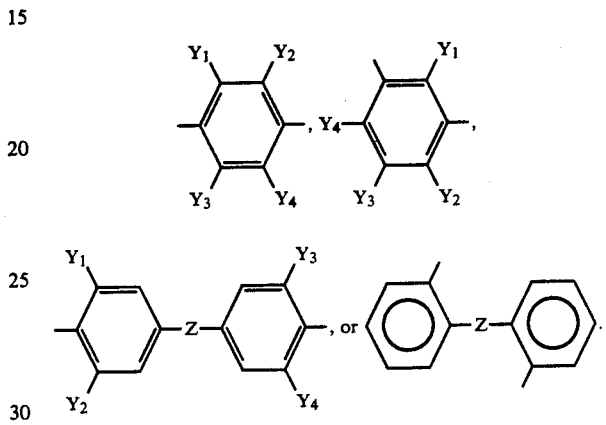

Most preferably, Ar$_a$ and Ar$_b$ (or Ar in the homopolymer) are selected from

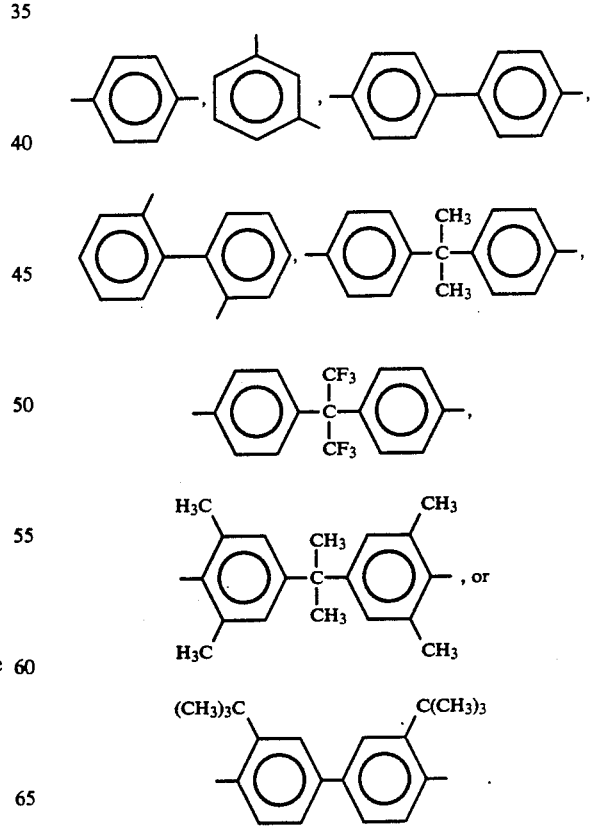

Ar$_a'$ and Ar$_b'$ are chosen from

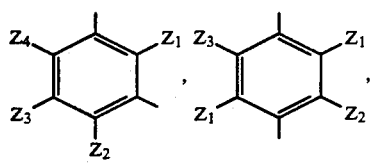

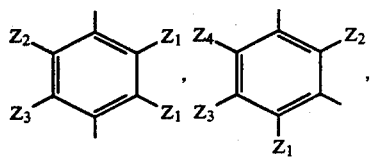

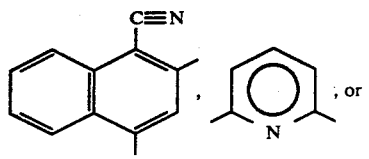

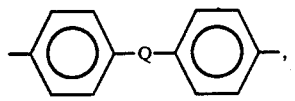

where —Q— is —SO$_2$— or

where —Z$_1$ is —C≡N, —NO$_2$, —SO$_2$R, or

R is C$_1$–C$_{10}$ alkyl, C$_6$–C$_{18}$ aryl; and Z$_2$, Z$_3$, Z$_4$ are Z$_1$ or —H; at least one of the Ar$_a$' or Ar$_b$' being selected from

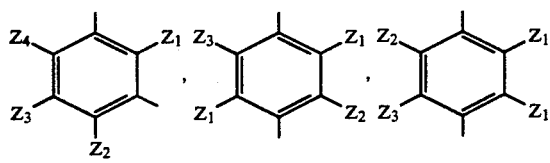

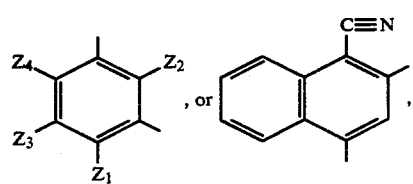

where —Z$_1$ is —C≡N and where —Z$_2$, —Z$_3$, —Z$_4$, and R are defined as above.

Preferably, Ar$_a$' and Ar$_b$' are chosen from

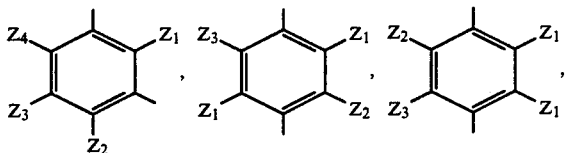

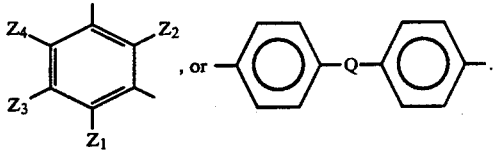

Most preferably, Ar$_a$' and Ar$_b$' are chosen from

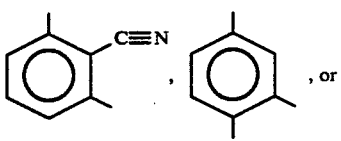

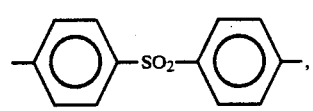

wherein at least one of the Ar$_a$' and Ar$_b$' being selected from

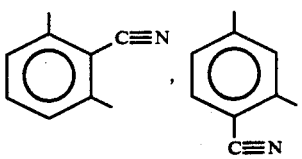

The aromatic cyanoether polymers can be formed into membranes for fluid separation such as gas separations by forming a solution of the polymer in solvent. The solution can be cast to form membranes such as dense film, asymmetric, and composite membranes by teachings generally known in the art. Such methods, are described, for example, in U.S. Pat. No. 4,717,393, the disclosure of which is incorporated by reference.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure whatsoever. In the following Examples, all temperatures are set forth in degree Celsius; unless otherwise indicated, all parts and percentages are by weight.

EXAMPLES

EXAMPLE 1

A mixture of bisphenol A (BPA, 228.29 g, 1.000 mol), 2,6-difluorobenzonitrile (2,6FBz, 139.38 g, 1.002 mol), potassium carbonate (200 g, 1.45 mol), N-methylpyrrolidinone (1.75 L), and toluene (0.75 L) is stirred under a nitrogen atmosphere. The mixture is steadily heated to 180° C. over 6 hours with periodic removal of the toluene-water azeotrope. The temperature is held at 180° C. for 3 hours, then the mixture is left to cool overnight. The mixture is filtered and the filtrate precipitated in warm water. The resultant polyether flake is washed 3 times in warm water, once in boiling water, twice in methanol, then air-dried overnight. The resulting polyether of is dried in a 125° C. vacuum oven for 8 hours; ninh=1.49 (DMAc/4% LiCl).

A solution of the polyether in methylene chloride is cast onto a glass plate using a doctor knife (20 weight percent solution; 20 mil knife clearance). The film is covered with a watchglass for 15 minutes, uncovered for 20 minutes, washed in a 1:1 (v:v) methanol-water solution overnight, and dried in a 120° C. vacuum oven for 6 hours. The permselectivity of the film is tested with a 21:79 mixture of oxygen and nitrogen at 500 psig; the permeate side of the film is maintained at 20 mmHg during the test: $P(O_2/N_2)=7.35$; $P(O_2)=91$ centiBarrers (cB).

The performance of the membranes is measured in terms of permselectivity. The permselectivity of a membrane for separating a two-component fluid mixture is defined as the ratio of the rate of passage of the first component of the mixture through the membrane to the rate of passage of the second component. In the case of a two-component mixture of $O_2$ and $N_2$, the rate of passage, that is, permeability, of a first component such as oxygen, expressed as $P(O_2)$, is measured in units of centiBarrers (cB) where:

$$cB = \frac{(10^{-12} \text{ cm}^3 \text{ (STP)}) \text{ (cm)}}{(\text{cm}^2) \text{ (sec) (cm Hg)}}$$

where cm³(STP) is the volume in cubic centimeters of permeated gas at standard temperature and pressure, (cm) is the thickness in centimeters of the membrane film, (cm²) is the area in square centimeters of the membrane film, (sec) is the time in seconds of the permeation measurement, and cm Hg is the pressure centimeters of mercury of the feed gas. Thus, for a mixture of $O_2$ and $N_2$, the permselectivity of a membrane for oxygen/nitrogen separation is expressed as the ratio of permeabilities of $O_2/N_2$, that is, $P(O_2)/P(N_2)$.

The permselectivity of the membrane for a mixture of $O_2$ and $N_2$ can be evaluated by a high pressure filter holder. The holder is modified so that the high-pressure side of the membrane can be continually swept with 21:79 molar volume mixture of oxygen/nitrogen at 500 psig. The conversion of feed gas, that is the ratio of permeate volume to feed volume per unit time, is kept under 1%.

The permeate gas composition is determined by evacuating the permeate side of the membrane down to 5-20 mmHg with a vacuum pump connected through a gas chromatograph sample loop. The gas chromatograph employed has a 72"×⅛" 60-80 mesh 5A molecular sieve column. Permeation rates are determined according to the method of W. J. Ward III et al., "Ultrathin Silicone/Poly-carbonate Membranes for Gas Separation Process", J. Membrane Sci., 1 (1976) 99, hereby incorporated by reference. Measurements of permeation rates are taken over several hours to ensure steady state permeation conditions.

EXAMPLE 2

A mixture of bisphenol AP (29.04 g, 0.1000 mol), 2,6FBz (13.94 g, 0.1002 mol), potassium carbonate (20 g, 0.145 mol), N-methylpyrrolidinone (175 mL), and toluene (75 mL) is polymerized as in Example 1: ninh=0.45 (DMAc/4% LiCl).

Film is prepared from a 24 wt% solution of the polymer in methylene chloride solvent and tested as in Example 1: $P(O_2/N_2)=7.30$; $P(O_2)=77$ cB.

EXAMPLE 3

A mixture of bisphenol AF (BPAF, 33.62 g, 0.1000 mol), 2,6FBz (13.94 g, 0.1002 mol), potassium carbonate (20 g, 0.145 mol), N-methylpyrrolidinone (175 mL), and toluene (75 mL) is polymerized as in Example 1: ninh=0.42 (DMAc/4% LiCl).

Film is prepared from a 24 wt% solution of the polymer in methylene chloride solvent and tested as in Example 1: $P(O_2/N_2)=6.58$; $P(O_2)=210$ cB.

EXAMPLE 4

A mixture of BPA (11.41 g, 0.0500 mol), BPAF (16.81 g, 0.0500 mol), 2,6FBz (13.94 g, 0.1002 mol), potassium carbonate (20 g, 0.145 mol), N-methylpyrrolidinone (175 mL), and toluene (75 mL) is polymerized as in Example 1: ninh=0.57 (DMAc/4% LiCl).

Film is prepared from a 20 weight percent solution of the polymer in methylene chloride solvent and tested as in Example 1: $P(O_2/N_2)=6.75$; $P(O_2)=139$ cB.

EXAMPLE 5

A mixture of thiodiphenol (21.83 g, 0.1000 mol), 2,6FBz (13.94 g, 0.1002 mol), potassium carbonate (20 g, 0.145 mol), N-methylpyrrolidinone (175 mL), and toluene (75 mL) is polymerized as in Example 1: ninh=0.75 (DMAc/4% LiCl).

Film is prepared from a 20 weight percent solution of the polymer in methylene chloride solvent and tested as in Example 1: $P(O_2/N_2)=7.71$; $P(O_2)=49$ cB.

EXAMPLE 6

A mixture of BPA (18.83 g, 0.0825 mol), 2,2'-dihydroxybiphenyl (5.12 g, 0.0275 mol), 2,6FBz (15.33 g, 0.1102 mol), potassium carbonate (20 g, 0.145 mol), N-methylpyrrolidinone (175 mL), and toluene (75 mL) is polymerized as in Example 1: ninh=0.61 (DMAc/4% LiCl).

Film is prepared from a 22 weight percent solution of the polymer in methylene chloride solution and tested as in Example 1: $P(O_2/N_2)=7.45$; $P(O_2)=89$ cB.

EXAMPLE 7

A mixture of BPA (18.26 g, 0.0800 mol), 1,5-dihydroxynapthalene (3.20 g, 0.0200 mol), 2,6FBz 13.94 g, 0.1002 mol), potassium carbonate (20 g, 0.145 mol), N-methylpyrrolidinone (175 mL), and toluene (75 mL) is polymerized as in Example 1: ninh=1.08 (DMAc/4% LiCl).

Film is prepared from a 20 weight percent solution of the polymer in methylene chloride solution and tested as in Example 1: $P(O_2/N_2)=7.42$; $P(O_2)=86$ cB.

EXAMPLE 8

A mixture of phenylhydroquinone (18.66 g, 0.1000 mol), 2,6FBz (6.97 g, 0.0501 mol), 4,4'-difluorophenylsulfone (4,4'FPS, 12.71 g, 0.0500 mol), potassium carbonate (20 g, 0.145 mol), N-methylpyrrolidinone (175 mL), and toluene (75 mL) is polymerized as in Example 1: ninh=0.69 (DMAc/4% LiCl).

Film is prepared from a 22 weight percent solution of the polymer in methylene chloride solution and tested as in Example 1: $P(O_2/N_2)=7.36$; $P(O_2)=79$ cB.

EXAMPLE 9

A mixture of phenolphthalein (31.83 g, 0.1000 mol), 2,6FBz (13.94 g, 0.1002 mol), potassium carbonate (20 g, 0.145 mol), N-methylpyrrolidinone (175 mL), and toluene (75 mL) is polymerized as in Example 1: ninh=0.87 (DMAc/4% LiCl).

Film is prepared from a 20 weight percent solution of the polymer in methylene chloride solution and tested as in Example 1: $P(O_2/N_2)=6.79$; $P(O_2)=82$ cB.

EXAMPLE 10

A mixture of BPA (17.12 g, 0.0750 mol), 3,3'-di-tert-butyldiphenol (7.46 g, 0.0250 mol), 2,6FBz (13.94 g, 0.1002 mol), potassium carbonate (20 g, 0.145 mol), N-methylpyrrolidinone (175 mL), and toluene (75 mL) is polymerized as in Example 1: ninh=0.37 (DMAc/4% LiCl).

Film is prepared from a 24 weight percent solution of the polymer in methylene chloride solution and tested as in Example 1: $P(O_2/N_2)=6.81$; $P(O_2)=142$ cB.

EXAMPLE 11

A mixture of tert-butylhydroquinone (16.62 g, 0.1000 mol), 2,6Bz (6.97 g, 0.0501 mol), 4,4'FPS (12.71 g, 0.0500 mol), potassium carbonate (20 g, 0.145 mol), N-methylpyrrolidinone (175 mL), and toluene (75 mL) is polymerized as in Example 1: ninh=0.67 (DMAc/4% LiCl).

Film is prepared from a 20 weight percent solution of the polymer in methylene chloride solution and tested as in Example 1: $P(O_2/N_2)=6.61$; $P(O_2)=252$ cB.

From the foregoing description, one skilled in the art can ascertain essential characteristics of this invention, and without departing from the spirit and scope thereof, make various changes and modifications of the invention to adapt to various usages and conditions.

I claim:

1. A membrane for gas separations comprising a polycyanoarylether.

2. The membrane of claim 1 wherein the polycyanoarylether of the formula $(-Ar_a-O-Ar_a'-O-Ar_b-O-Ar_b'-O-)_n$ where $Ar_a$, $Ar_a'$, $Ar_b$ and $Ar_b'$ are aryl groups and where $Ar_a'$ and $Ar_b'$ are aromatic rings at least one of the $Ar_a'$ or $Ar_b'$ rings having at least one cyano group directly attached thereto.

3. The membrane of claim 2 wherein $Ar_a$ and $Ar_b$ are independently selected from

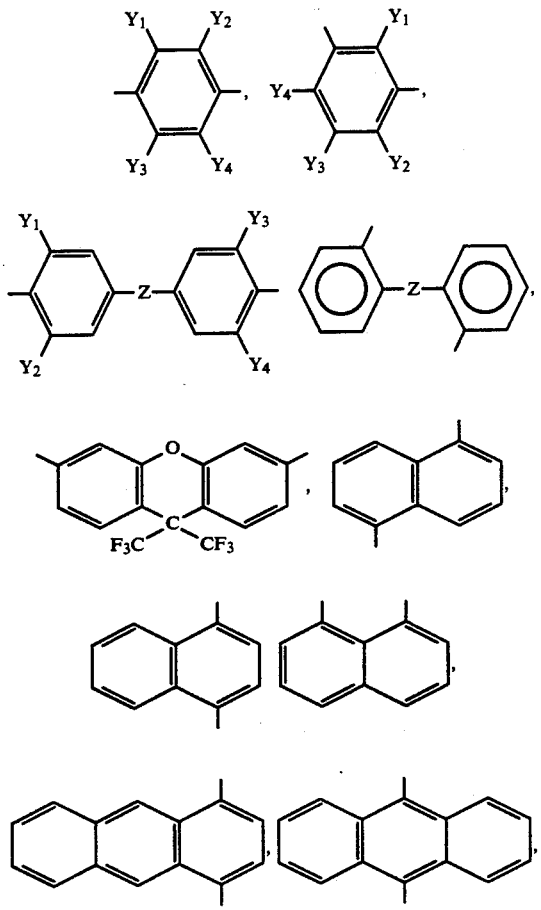

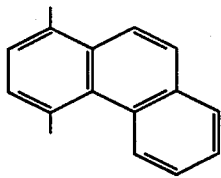

phenolphthalein, or substituted phenolphthaleins where —Z— is any one of carbon-carbon single bond, or

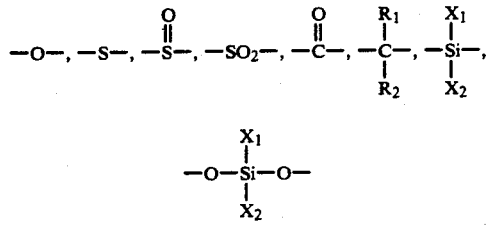

where $R_1$ and $R_2$ independently are H, $C_1$-$C_{10}$ alkyl, $C_1$-$C_{10}$ fluoroalkyl, or $C_6$-$C_{14}$ aryl; where $X_1$ and $X_2$ independently are $C_1$-$C_{10}$ alkyl, $C_1$-$C_{10}$ fluoroalkyl or $C_6$-$C_{14}$ aryl; and where $Y_1$, $Y_2$, $Y_3$, and $Y_4$ independently are halogen, $R_1$, $R_2$; and where $Ar_a'$ and $Ar_b'$ are independently selected from

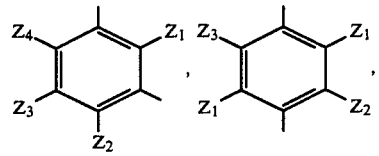

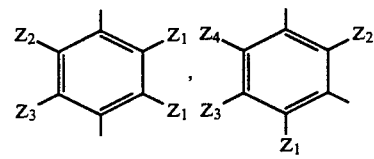

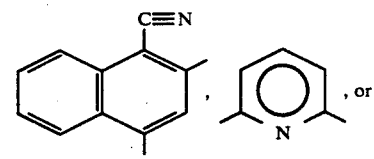

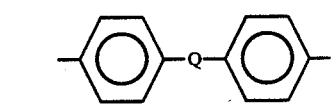

where —Q— is —SO$_2$— or

where —$Z_1$ is C≡N, —NO$_2$, —SO$_2$R, or

R is $C_1$-$C_{10}$ alkyl or $C_6$-$C_{18}$ aryl; and —$Z_2$, —$Z_3$ and —$Z_4$ are —$Z_1$ or —H; wherein at least one of $Ar_a'$ or $Ar_b'$ is selected from

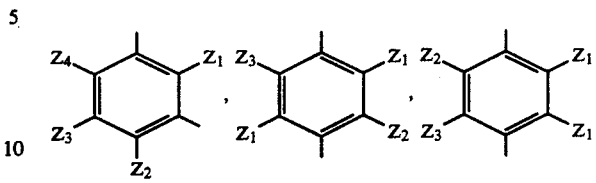

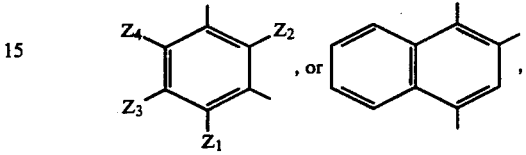

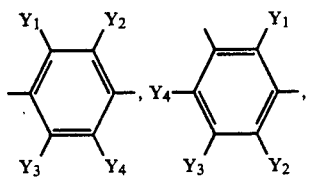

where —$Z_1$ is C≡N and —$Z_2$, —$Z_3$, and —$Z_4$ are defined as above.

4. The membrane of claim 3 wherein $Ar_a$ and $Ar_b$ are independently selected from

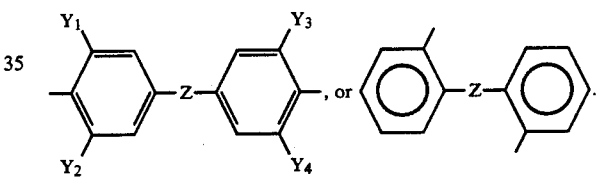

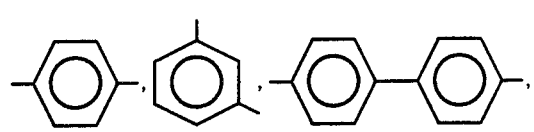

5. The membrane of claim 4 where $Ar_a$ and $Ar_b$ are independently selected from

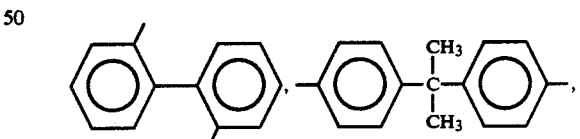

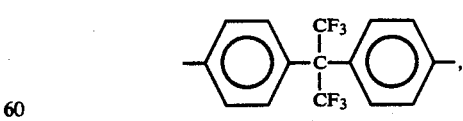

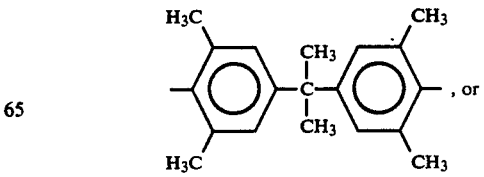

-continued

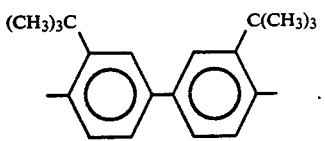

6. The membrane of claim 5 wherein $Ar_a'$ and $Ar_b'$ are independently selected from

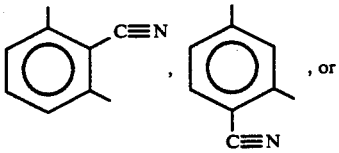

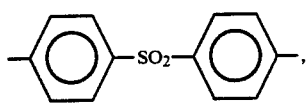

wherein at least one of $Ar_a'$ or $Ar_b'$ is selected from

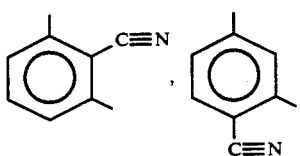

7. The membrane of claim 2 wherein $Ar_a$ is the same as $Ar_b$ and $Ar_a'$ is different from $Ar_b'$.

8. The membrane of claim 2 wherein $Ar_a'$ is the same as $Ar_b'$ and $Ar_a$ is different from $Ar_b$.

9. The membrane of claim 2 wherein $Ar_a$ is different from $Ar_b$ and $Ar_a'$ is different from $Ar_b'$.

10. The membrane of claim 2 wherein $Ar_a$ is the same as $Ar_b$ and wherein $Ar_a'$ is the same as $Ar_b'$, both $Ar_a'$ and $Ar_b'$ being aromatic rings having at least one cyano group attached thereto.

11. The membrane of claim 3 wherein $Ar_a$ is different from $Ar_b$ and $Ar_a'$ is the same as $Ar_b'$, both $Ar_a'$ and $Ar_b'$ being selected from

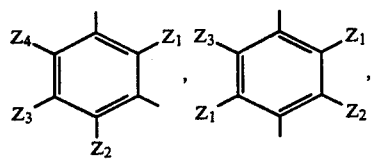

-continued

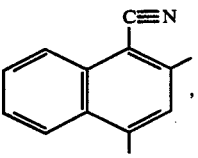

where $-Z_1$ is $-C{\equiv}N$ and $-Z_2$, $-Z_3$, and $-Z_4$ are selected from $-Z_1$, $-H$, $-NO_2$, $-So_2R$, or $$-\overset{O}{\underset{\|}{C}}-R,$$

where R is $C_1$-$C_{10}$ alkyl or $C_6$-$C_{18}$ aryl.

12. The membrane of claim 3 wherein $Ar_a$ is the same as $Ar_b$ and wherein $Ar_a'$ is different from $Ar_b'$.

13. The membrane of claim 3 wherein $Ar_a$ is different from $Ar_b$ and wherein $Ar_a'$ is different from $Ar_b'$.

14. The membrane of claim 3 wherein $Ar_a$ is the same as $Ar_b$ and wherein $Ar_a'$ is the same as $Ar_b'$, both $Ar_a'$ and $Ar_b'$ being selected from

where $-Z_1$ is $-C{\equiv}N$ and $-Z_2$, $-Z_3$, and $-Z_4$ are selected from $-Z_1$, $-H$, $-NO_2$, $-So_2R$, or $$-\overset{O}{\underset{\|}{C}}-R,$$

where R is $C_1$-$C_{10}$ alkyl or $C_6$-$C_{18}$ aryl.

* * * * *